United States Patent
Dawkins

[15] 3,645,288
[45] Feb. 29, 1972

[54] SUPPLY UNIT FOR ORAL CLEANER
[72] Inventor: Thomas C. Dawkins, 132 West Main, Anadarko, Okla. 73005
[22] Filed: Mar. 12, 1970
[21] Appl. No.: 18,905

[52] U.S. Cl. ..........................137/255, 137/341, 128/173 R
[51] Int. Cl. ....................................F16k 51/00, F16k 27/00
[58] Field of Search ..................137/341, 255; 15/24, 29; 134/100, 101; 128/173 R

[56] References Cited

UNITED STATES PATENTS

| | | | |
|---|---|---|---|
| 1,914,868 | 6/1933 | Rolstad | 137/341 X |
| 2,098,663 | 11/1937 | Juhasz | 137/341 X |
| 2,150,842 | 3/1939 | Oliver | 15/24 |
| 2,215,688 | 9/1940 | Chamberlain | 137/341 X |
| 2,746,465 | 5/1956 | Farison | 134/100 X |
| 2,827,912 | 3/1958 | Lung | 137/341 X |
| 2,993,357 | 7/1961 | Smith et al. | 134/101 X |
| 3,108,300 | 10/1963 | Richmond | 15/24 |
| 3,180,350 | 4/1965 | Rill, Jr. et al. | 137/341 X |
| 3,380,080 | 4/1968 | Farrell | 137/341 X |
| 3,457,944 | 7/1969 | Cary et al. | 137/341 |

*Primary Examiner*—Samuel Scott
*Attorney*—Clarence A. O'Brien and Harvey B. Jacobson

[57] ABSTRACT

A cleanser fluid is mixed with water pressurized by a motor operated pump inducing flow of the water from a reservoir past an adjustable outlet restriction at one end of a pickup tube extending into said cleanser fluid. The water is heated within the reservoir to a temperature suitable for introduction into the oral cavity by means of a fluid pressure operated implement.

10 Claims, 5 Drawing Figures

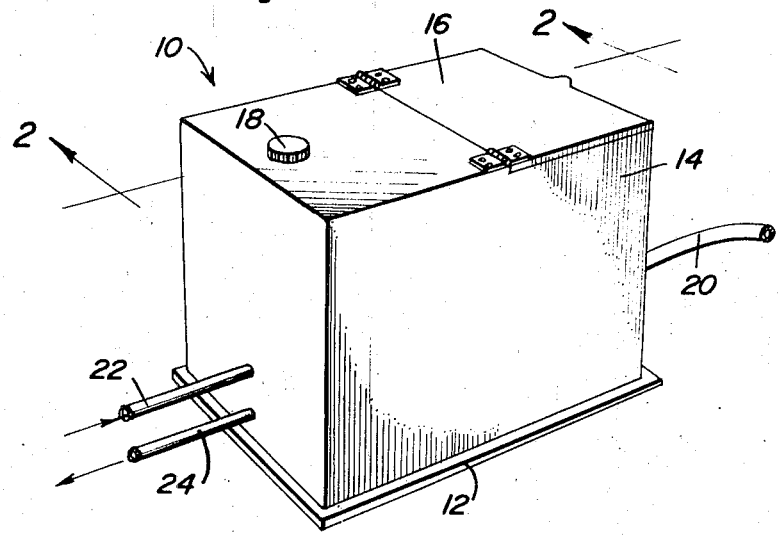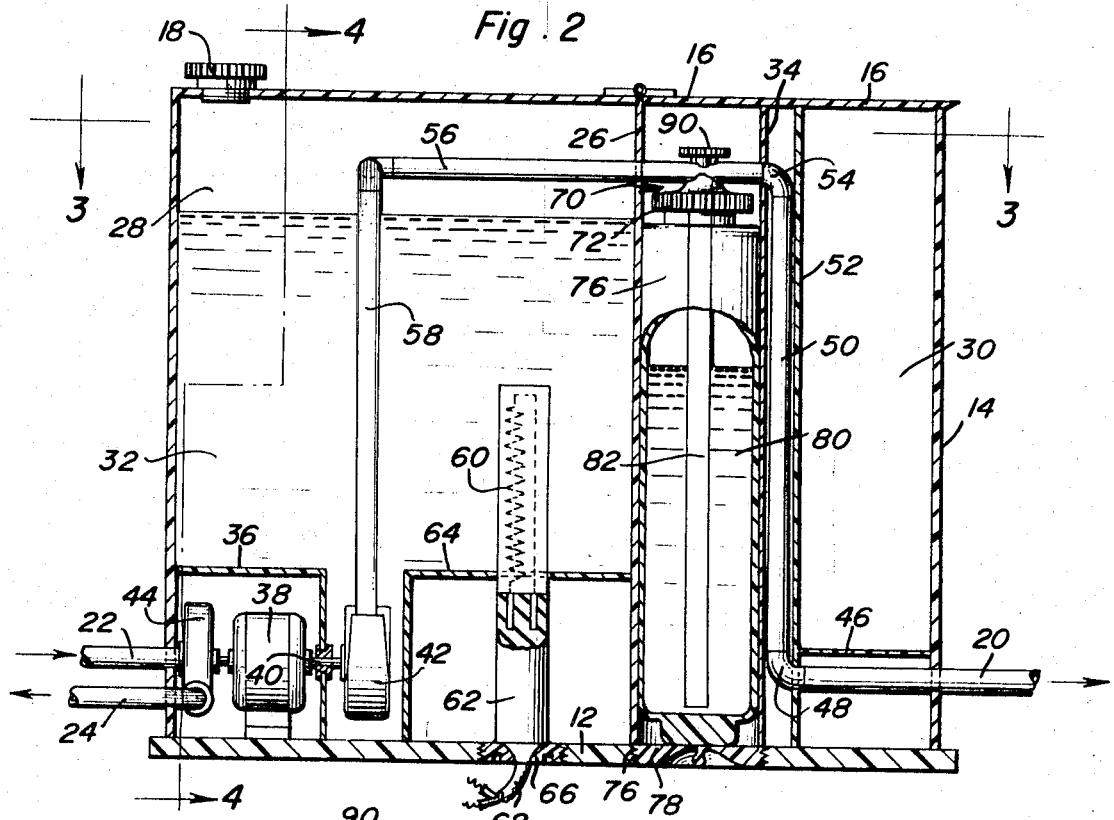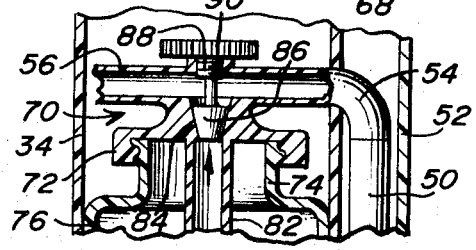
Fig. 1
Fig. 2
Fig. 5
Thomas C. Dawkins
INVENTOR.
BY *Clarence A.O'Brien*
and *Harvey B. Jacobson*
Attorneys Thomas C. Dawkins
INVENTOR.

BY *Clarence A. O'Brien*
*and Harvey B. Jacobson*
Attorneys

SUPPLY UNIT FOR ORAL CLEANER

This invention relates to the supply of a pressurized cleansing fluid for a fluid-operated implement such as a rotary toothbrush.

Fluid-operated implements and in particular those which are introduced into the oral cavity for cleaning or treatment of teeth and gums, require a source of pressurized fluid. Generally, different facilities or equipment are utilized in order to meet different requirements associated with such fluid-operated implements. For example, the fluid may either be pure water or a cleanser fluid. Certain temperature conditions may, on the other hand, be required in connection with the fluid. Also, where a mixture or solution of fluids are utilized, any change in the proportions of the fluid ingredients requires complete replacement of the fluid reservoir. It is therefore an important object of the present invention to provide a fluid pressure supply unit of exceptional versatility which is capable of meeting the different requirements aforementioned.

In accordance with the present invention, the fluid pressure supply unit is a complete and compact device having a reservoir of water to be mixed with a concentrated cleanser fluid in adjustably varied proportions. The cleanser fluid is carried in a replaceable container removably mounted within the unit while the water within the reservoir is heated to the proper temperature by heating means. A motor-operated pump induces flow of the water from the reservoir past an adjustable pickup device mounted on the container. Also, a suction pump may be driven by the motor for the water-displacing pump in order to provide a source of suction pressure to which a suction tube may be connected for removal of fluid discharged into the oral cavity of a person by a fluid-operated implement to which the unit pressure conduit is connected. The implement may be, for example, a brushing unit as disclosed in my copending application, U.S. Ser. No. 18,906, filed Mar. 12, 1970, now U.S. Pat. No. 3,605,154, issued Sept. 20, 1971.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the fluid pressure supply unit of the present invention.

FIG. 2 is an enlarged side sectional view taken substantially through a plane indicated by section line 2—2 in FIG. 1.

FIG. 5 is an enlarged partial sectional view taken substantially through a plane indicated by section line 5—5 in FIG. 3.

Figure 3:
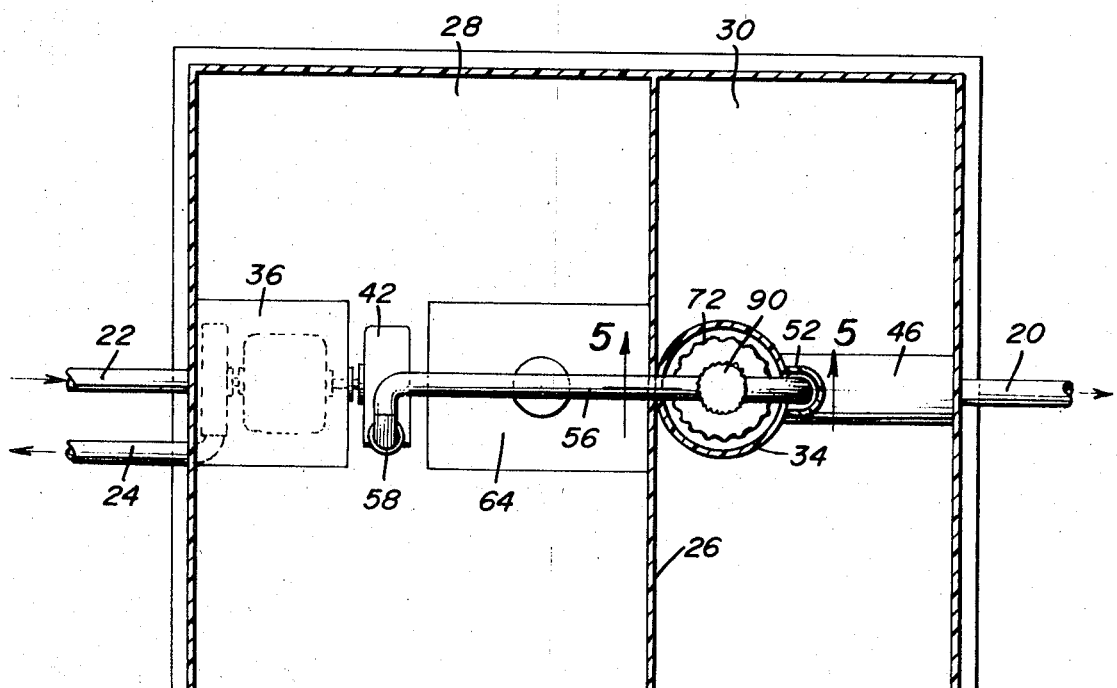
FIG. 3 is a top sectional view taken substantially through a plane indicated by section line 3—3 in FIG. 2.
Figure 4:
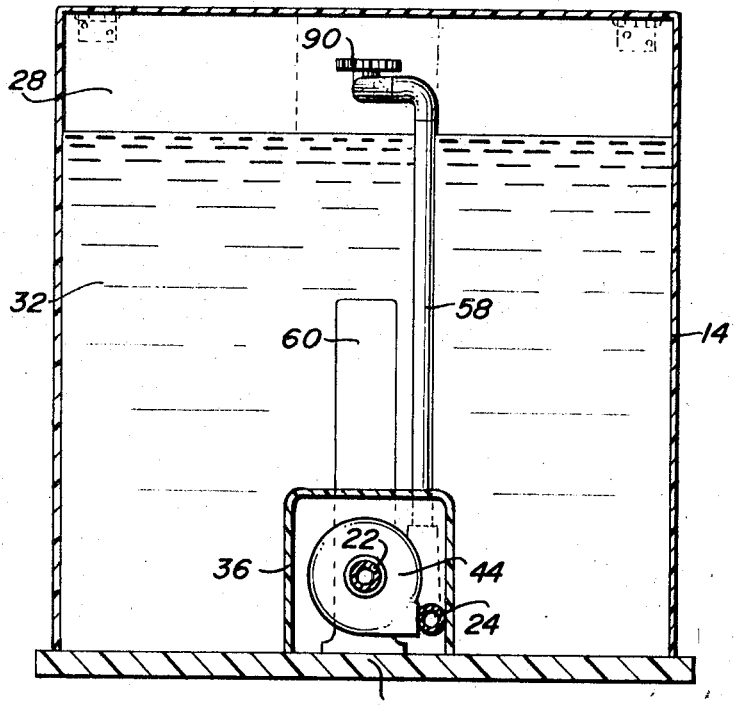
FIG. 4 is a transverse sectional view taken substantially through a plane indicated by section line 4—4 in FIG. 2.

Referring now to the drawings in detail, FIG. 1 illustrates the fluid pressure supply unit generally denoted by reference numeral 10. Except for the drive motor, the unit is constructed from plastic materials and includes a base 12 to which a housing 14 is secured. The housing may be made in any desired shape. In the illustrated embodiment, the top wall of the housing is provided with a hinged cover 16 through which access to the interior of the unit is provided. A filler cap 18 is also provided on the top wall for replacing water once it has become depleted. A pressure discharge conduit 20 extends from one side of the housing opposite a side from which a suction tube 22 extends. An exhaust drain tube 24 also extends from the housing adjacent the suction tube 22.

Referring now to FIGS. 2 and 3 in particular, the housing is internally divided by a partition wall 26 into a reservoir chamber 28 and an implement receptacle chamber 30. A body of water 32 is adapted to be enclosed within the reservoir chamber. The receptacle chamber 30 on the other hand is adapted to store an implement operated by the fluid under pressure supplied thereto by the conduit 20, such as the mechanical brushing unit disclosed in my copending application aforementioned. Also, a vertical tubular receptacle 34 is mounted on the base 12 within the receptacle chamber 30 adjacent to the partition wall 26. The receptacle chamber 30 as well as the upper end of the receptacle 34 will be exposed upon opening of the hinged cover 16.

A sealed enclosure 36 mounted within the reservoir chamber 28 on the base 12, protectively encloses the electric drive motor 38 having an output shaft extending axially from one end through a pressure sealing bearing assembly 40, to drive a water-displacing pump 42. The output shaft of the motor extending from the other axial end thereof within the enclosure 36, drives a suction pump 44 having an intake to which the suction tube 22 is connected and a discharge to which the drain tube 24 is connected. Thus, when the motor 38 is energized to operate the water-displacing pump 42, suction pressure may also be developed through the pump 42 in order to evacuate any discharge from the fluid-operated implement to which the pressure conduit 20 is connected.

The pressure conduit 20 extends into the receptacle chamber 30 of the housing 14 through a protective shield 40 and is connected by an elbow 48 to a vertical pipe section 50 extending through a vertical shield 52 positioned against one side of the tubular receptacle 34. The upper end of the vertical pipe section 50 is connected by elbow 54 to a horizontal pipe section 56 that extends through the upper portion of the tubular receptacle into the reservoir chamber. The horizontal pipe section is connected to the upper end of a vertical discharge conduit 58 to which the water-displacing pump 42 is connected. Water is withdrawn from the reservoir chamber 28 by the pump 42 through the foregoing conduit arrangement and discharged under pressure through the pressure conduit 20. The temperature of the water so discharged is regulated by means of an electric heating element 60 seated on a power receptacle 62 protectively enclosed within the reservoir chamber 28 by the enclosure 64 through which the electrical heating element 60 extends. The power receptacle may be removably mounted on the base 12 by an externally threaded element 66. Electrical power is supplied by means of an electrical power conduit 68.

Referring now to FIGS. 2 and 5, the horizontal pipe section 56 through which the water is conducted under pressure, is connected to a flow-responsive pickup device 70 disposed within the upper portion of the tubular receptacle 30. The pickup device 70 includes an internally threaded closure cap 72 connected to the pipe section 56 and adapted to threadedly receive the upper neck portion 74 of a container 76 removably screwed into the closure cap through an opening 76 formed in the base 12. A threaded plug 78 closes the opening 76 as shown in FIG. 2 in order to hold and position the container 76 within the receptacle 34. Thus, the container may be removed and replaced when its contents id depleted. The contents of the container may be a concentrated oral cleanser 80 into which a vertical pickup tube 82 extends. The pickup tube, which is open at its lower end, is connected to the closure cap as more clearly seen in FIG. 5 in order to establish fluid communication between the container at the lower end of the pickup tube with the horizontal pipe section 56 through a conical passage 84 formed in the closure cap. A conical flow-restricting element 86 is adjustably positioned within the passage 84 in order to regulate the flow area through which upward flow of the fluid 80 is conducted and introduced into the water flowing through the horizontal pipe section 56. It will be apparent to those skilled in the art, that the reduction in static pressure of the water conducted through the pipe section 56 in view of its velocity head, will produce a suction pressure at the passage 84 causing the upflow of the fluid 80 from the container 76. The quantity of fluid 80 introduced into the water will of course depend upon the effective flow area in the passage 84. Thus, the flow restrictor element 86 is adjustably positioned in order to vary the proportion of fluid 80 mixed with the water. The flow restrictor element is therefore connected to an externally threaded stem 88 threadably mounted within a projection formed on the horizontal pipe section. An adjustment knob 90 is connected to the threaded stem so that the position of the restrictor element 86 may be manually adjusted when the knob 90 is exposed upon opening of the hinge cover 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A liquid supply device comprising a housing having a base, means internally partitioning the housing into a reservoir chamber and an implement-storing chamber, a container of liquid removably mounted within said storing chamber and supported on the base adjacent the partitioning means, fixedly mounted conduit means extending from the reservoir chamber through the storing chamber above the container, power-operated pump means connected to the conduit means within the reservoir chamber for inducing flow of a carrier liquid through the conduit means from the reservoir chamber, and flow-responsive means fixedly connected to the conduit means within the storage chamber for injecting an active liquid from the container into the conduit means.

2. The combination of claim 1 wherein said flow-responsive means comprises a closure cap fixed to the conduit means and engageable with the container, a pickup tube extending from the closure cap into the container, said cap having a passage establishing fluid communication between the conduit means and the pickup tube, and a restrictor element adjustably mounted by the conduit means within the passage.

3. The combination of claim 1 wherein said housing includes an access opening in the base through which the container is inserted, and a plug closing the access opening to position the container in operative relation to the flow-responsive means and the conduit means.

4. The combination of claim 1 including a suction pump driven simultaneously with the power-operated pump means within the housing, suction tubing extending from the pump and discharge tubing connected to the pump.

5. The combination of claim 4 wherein said flow-responsive means comprises a closure cap fixed to the conduit means and engageable with the container, a pickup tube extending from the closure cap into the container, said cap having a passage establishing fluid communication between the conduit means and the pickup tube, and a restrictor element adjustably mounted by the conduit means within the passage.

6. The combination of claim 5 wherein said housing includes an access opening in the base through which the container is inserted for removable connection to the closure cap, and a plug closing the access opening to position the container in operative relation to the flow-responsive means and the conduit means.

7. The combination of claim 6 wherein said active liquid is a dental cleanser and the carrier liquid is water.

8. In combination with a fluid flow operated cleaning implement and a suction tube through which fluid discharged by the implement is removed, a fluid supply device comprising a housing having a base, means internally partitioning the housing into a reservoir chamber and an implement storing chamber, a container of liquid removably mounted within said storing chamber supported on the base adjacent the partitioning means, conduit means connected to the implement and extending from the reservoir chamber through the storing chamber above the container, power-operated pump means connected to the conduit means within the reservoir chamber for inducing flow of a carrier liquid through the conduit means from the reservoir chamber, flow-responsive means fixedly mounted in the housing and connected to the conduit means for injecting an active liquid from the container into the conduit means, and a suction pump connected to the suction tube and driven simultaneously with the power-operated pump means.

9. The combination of claim 8 wherein said flow-responsive means includes a closure cap secured to the container and having a passage and a restrictor element adjustably mounted by the conduit means within the passage.

10. A liquid supply device comprising a housing having an internal partition forming a liquidtight refillable reservoir chamber and a storage chamber, a movable closure member through which only the storage chamber is opened and a base, conduit means fixedly mounted within the housing extending from the reservoir chamber through the storage chamber for conducting liquid, a removable container, receptacle means fixedly mounted within the storage chamber of the housing for receiving the removable container therein, flow-responsive valve means mounted on the conduit means for operative connection to the container to inject an active liquid from the container into the conduit means, and removable closure means mounted by the base in operative relation to the receptacle means for supporting the container in operative position within the receptacle means, said flow-responsive means being exposed from the storage chamber upon opening of the movable closure member.

* * * * *